C. B. ATWOOD.
STOCK STOP FOR AUTOMATIC SCREW MACHINES AND THE LIKE.
APPLICATION FILED OCT. 1, 1908.
956,874.
Patented May 3, 1910.
2 SHEETS—SHEET 1.
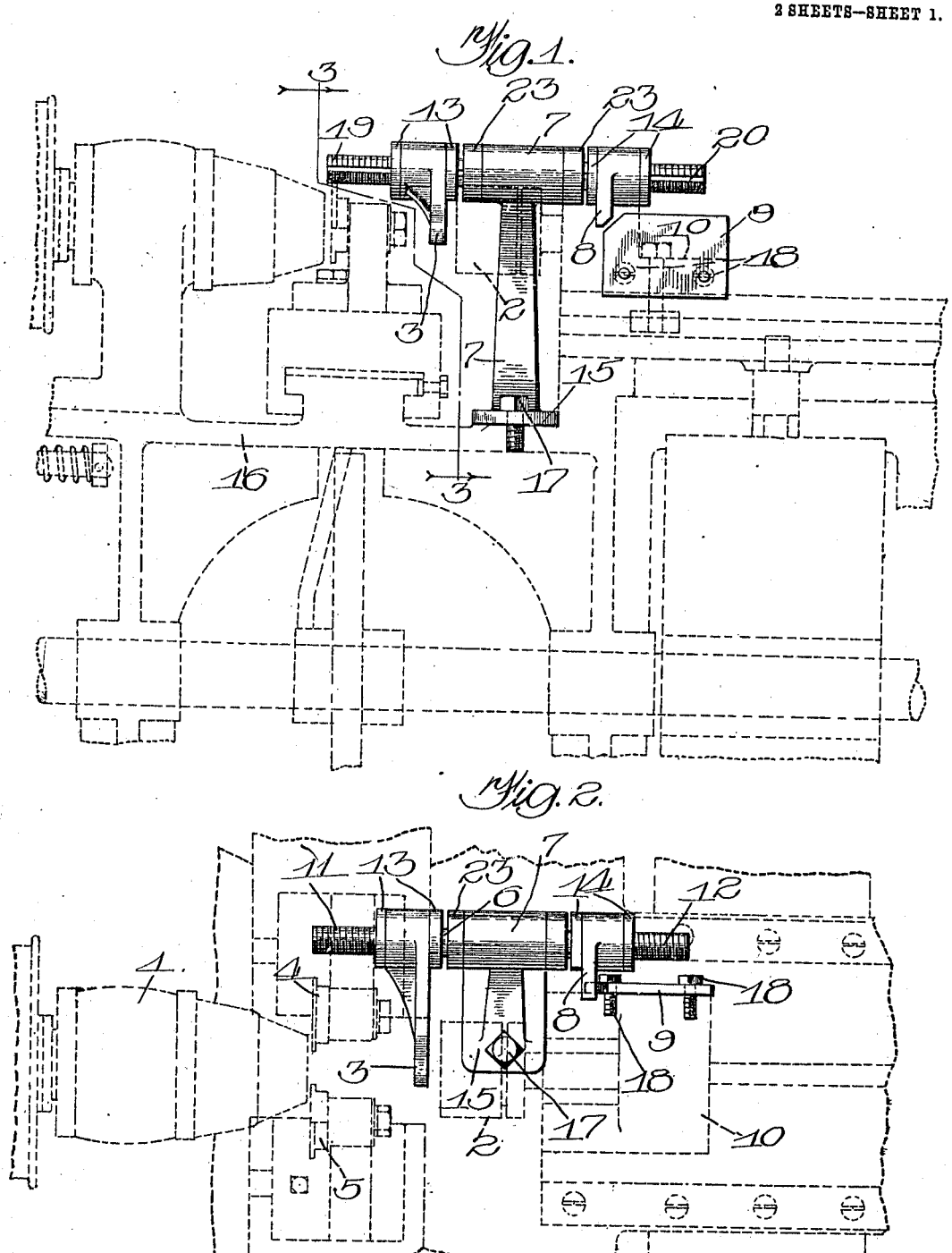

C. B. ATWOOD.
STOCK STOP FOR AUTOMATIC SCREW MACHINES AND THE LIKE.
APPLICATION FILED OCT. 1, 1908.
956,874.
Patented May 3, 1910.
2 SHEETS—SHEET 2.
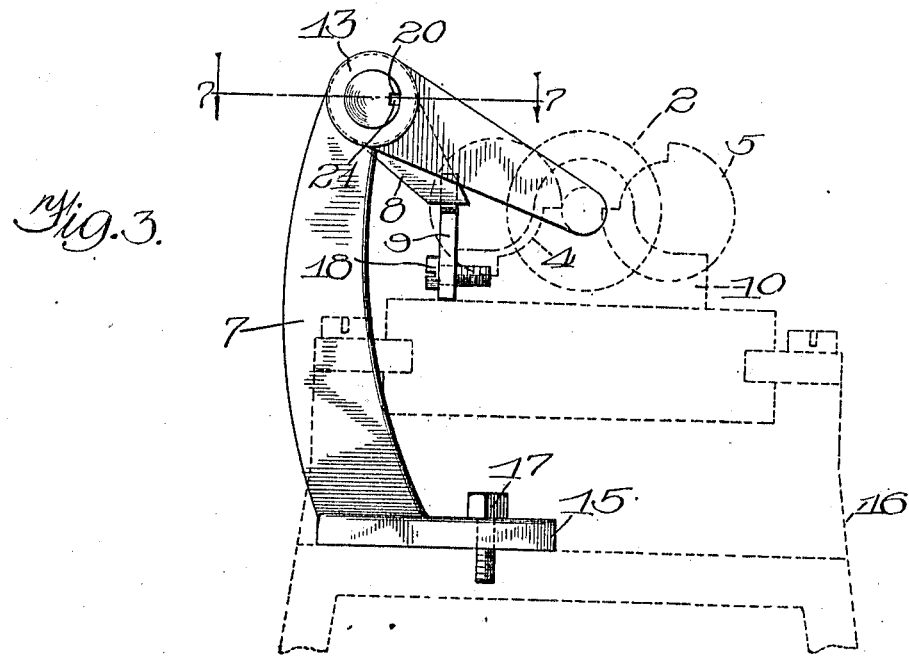
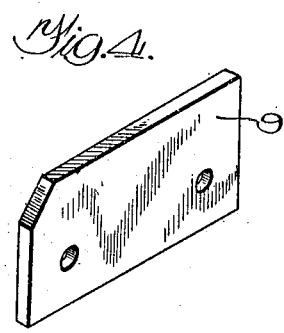
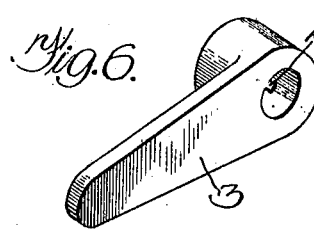
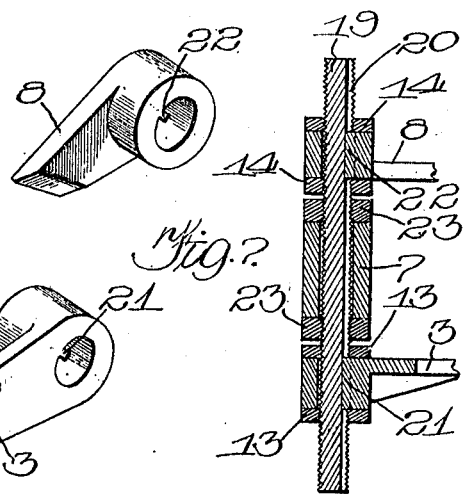
Witnesses:
Inventor:
Clarence B. Atwood

UNITED STATES PATENT OFFICE.

CLARENCE B. ATWOOD, OF BELVIDERE, ILLINOIS, ASSIGNOR TO NATIONAL SEWING MACHINE COMPANY, OF BELVIDERE, ILLINOIS, A CORPORATION OF ILLINOIS.

STOCK-STOP FOR AUTOMATIC SCREW-MACHINES AND THE LIKE.

956,874.              Specification of Letters Patent.      Patented May 3, 1910.

Application filed October 1, 1908. Serial No. 455,697.

*To all whom it may concern:*

Be it known that I, CLARENCE B. ATWOOD, a citizen of the United States, residing at Belvidere, in the county of Boone and State of Illinois, have invented certain new and useful Improvements in Stock-Stops for Automatic Screw-Machines and the Like, of which the following is a full, clear, and exact specification.

This invention relates to means for limiting or stopping the stock or rod which is to be threaded or otherwise operated upon in automatic screw machines and the like, so that the exact amount of rod projecting from the chuck for entry into the die or other tool may be automatically and accurately gaged, and the invention has for its primary object to provide an improved, simple and efficient form of stock stop which may be conveniently attached to an ordinary screw cutting machine and readily adjusted.

With a view to the attainment of these ends and the accomplishment of certain other objects which will hereinafter appear, the invention consists in the features of novelty which will now be described with reference to the accompanying drawings and more particularly pointed out in the claims.

In the said drawings—Figure 1 is a side elevation of my improved stock stop applied to a screw cutting machine which is shown in dotted lines. Fig. 2 is a plan view thereof. Fig. 3 is an end view looking from the line 3—3 of Fig. 1. Fig. 4 is a detail perspective view of the throw-out cam. Fig. 5 is a detail perspective view of the stop-lifting arm. Fig. 6 is a similar view of the stop. Fig. 7 is a section on line 7—7, Fig. 3.

1 represents in dotted lines the head-stock or chuck which holds the rod (not shown) to be threaded by the die 2, which is also shown in dotted lines, and in fact, all of the usual parts of the screw cutting machine are shown in dotted lines. It is of course understood that the rod, preparatory to being grasped by the chuck 1 is fed through the chuck until sufficiently projected to form the screw or bolt to be produced, and in order that this projection may be accurately determined or gaged, a stop 3 is provided and arranged opposite the passage through the chuck 1 and the die 2 at the time when the rod or stock is projected through the chuck. The desired length being thus measured off from the rod, the stop 3 is removed out of the way, and the die 2 advances over the rod. The screw being formed, the rod is severed by any suitable means, such as the usual cutters 4, 5, arranged adjacent the end of the chuck.

In order that the stop 3 may be automatically lifted out of the way as the die 2 advances, it is mounted upon a rocker shaft 6 journaled in a standard or bracket 7 and provided with an arm 8 arranged in the line of movement of a beveled plate or cam 9 secured to the tail-stock or carriage 10 which carries and advances the die 2 in the usual way, so that as the carriage 10 advances, the stop 3 is automatically lifted above the die 2, and as it recedes, the stop again descends into position for intercepting the rod or stock as it is projected through the chuck 1.

The ends of the shaft 6 are preferably screw threaded, as shown at 11, 12 to receive nuts 13, 14, whereby the stop 3 and the arm 8 may be clamped in position, or these elements may be attached to the shaft in any other convenient way. The standard or bracket 7 is of simple form, provided with a foot 15 adapted to be secured to the bed 16 of the machine at any appropriate place by means of a screw or bolt 17, and the cam 9 is a simple flat plate with a beveled corner adapted to be secured in place against the side of the carriage 10 by screws 18.

When it is desired to vary the length of the screw or projection of the rod from the chuck 1, it is quite apparent that the result may be accomplished by simply loosening the nuts 13 and slipping the stop 3 along the shaft 6 to the desired position, when the nuts 13 may be tightened for again locking the stop in place. If desired, the shaft at its screw threaded ends, at least, may be provided with grooves 19, 20, and the stop 3 and arm 8, with splines 21, 22 fitting therein, to maintain the relative position of the stop to the arm. It is also evident that by changing the position of the arm 8 on the screw threaded end 12, the time of lifting the stop 3 may be accurately determined with relation to the movement of the carriage 10. The shaft 6 may be held against longitudinal movement in its standard 7 by any suitable means, such as collars 23 secured thereon.

Having thus described my invention, what I claim is:

1. In a device for the purpose described, the combination with stock-holding means and a tool carriage mounted on the same axis therewith, of a stop movable on an axis parallel to the first said axis, and means operated by the tool carriage for moving said stop into and out of line with the stock.

2. In a device for the purpose described, the combination with stock-holding means and a tool carriage mounted on the same axis therewith, of a stop oscillatable on an axis parallel to the first said axis, and means operated by the tool carriage for oscillating said stop into and out of line with the stock.

3. In a device for the purpose described, the combination with stock-holding means, of a tool carriage movable axially toward and away from said stock-holding means, a stop oscillatable on an axis parallel to the axis of said tool carriage, and means reciprocated by the tool carriage for moving said stop into and out of line with the stock.

4. In a device for the purpose described, the combination with a stock holding means rotatable on an axis and a reciprocable tool carriage, of a stop oscillatable on an axis parallel to the first said axis, an arm mounted to swing about the oscillating axis of said stop, said arm being adjustable axially but held against relative angular movement with respect to said stop, and means rigidly mounted on said carriage for oscillating said arm.

5. In a device for the purpose described, the combination with a head stock adapted to hold work to be operated upon, and a tail stock adapted to carry a tool for operating upon said work, said stocks being suitably mounted to provide a relative movement toward and away from each other, of a stop movable on an axis parallel to the line of said relative movement, and means operated by one of said stocks for moving said stop into and out of line with the work.

6. In a device for the purpose described, the combination with a rotating chuck and a reciprocating tool carriage, said chuck and carriage being co-axially mounted, a rocker shaft mounted to oscillate on an axis parallel to the axis of the chuck and carriage, a stop mounted on said rocker shaft in such manner as to be oscillated into and out of the axis line of the chuck, a cam arm adjustable axially of said rocker shaft, and a cam plate rigidly mounted on the tool carriage and adapted to engage said cam arm.

7. In a machine for the purpose described, the combination with the bed of the machine, of a rotating chuck and reciprocating tool carriage coaxially mounted thereon, of a standard rigid with said bed, a shaft oscillatably mounted in said standard on an axis parallel to the axis of said chuck and tool carriage, a stop and a cam arm adjustably mounted on opposite ends of said oscillating shaft, and a cam plate rigidly mounted on the tool carriage and adapted to engage said cam arm to oscillate the stop into and out of the axis line of said chuck and carriage.

In testimony whereof I have signed my name to this specification, in the presence of two subscribing witnesses, on this 14th day of September A. D. 1908.

CLARENCE B. ATWOOD.

Witnesses:
F. L. GOODRICH,
WILLIS L. BROWN.